Patented May 23, 1939

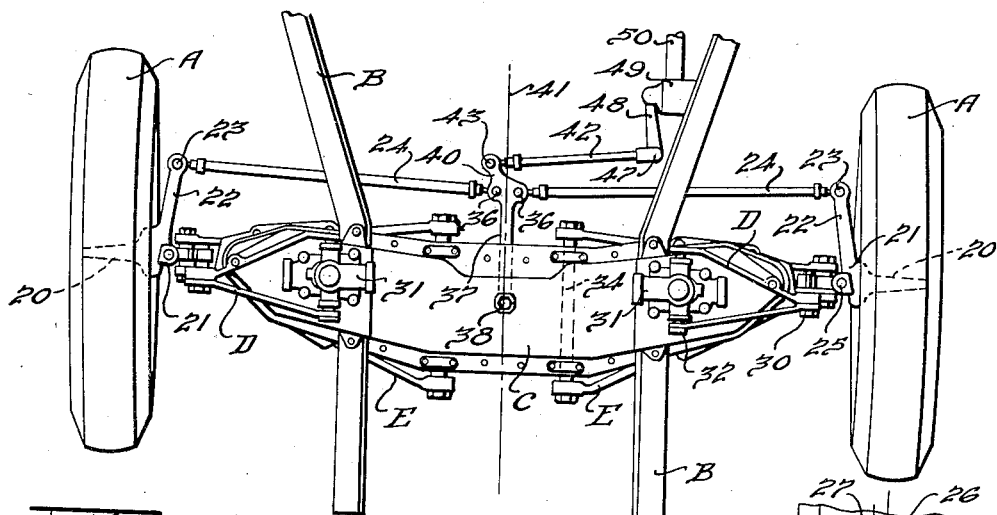

2,159,344

UNITED STATES PATENT OFFICE 2,159,344

MOTOR VEHICLE

Frederic W. Slack, Detroit, Mich., assignor to Chrysler Corporation, Highland Park, Mich., a corporation of Delaware Original application March 30, 1935, Serial No. 13,851. Divided and this application November 18, 1937, Serial No. 175,176

4 Claims. (Cl. 280—95)

This invention relates to motor vehicles and refers more particularly to improvements in steering for the ground wheels of such vehicles.

This application is a division of my copending application Serial No. 13,851, filed March 30, 1935.

Heretofore objectionable variation in the relative amount of swing of the steering ground wheels has been experienced for a given rotation of the hand steering wheel equally to the right and left. This variation is especially pronounced in certain types of otherwise desirable steering mechanisms as, by way of example, where the customary drag link extends from a central longitudinally disposed guide link laterally to the actuating pitman arm, the ends of the drag link being spaced in a direction longitudinally of the vehicle.

It is an object of my invention to provide improvements overcoming the aforesaid objectionable variation in steerable ground wheel movements whereby the ground wheels move for substantially equal amounts in opposite directions for the same amount of movement of the hand steering wheel in corresponding opposite directions.

Further objects and advantages of my invention will be more apparent from the following detailed description of one illustrative embodiment of my invention, reference being had to the accompanying drawing in which:

Fig. 1 is a top plan view of the front end of a vehicle illustrating my improved steering mechanism.

Fig. 2 is an enlarged sectional front elevational view of the right half portion of the Fig. 1 structure.

Fig. 3 is a diagrammatic view illustrating a part of the steering geometry.

In the drawing reference character A represents the front steering ground wheels of the vehicle having the frame structure B which includes the fabricated cross member C. Since each wheel is preferably similarly suspended, my description will, for the most part, be directed to a representative side of the vehicle as illustrated in Fig. 2. I have illustrated my improved steering mechanism in connection with independently sprung steering ground wheels although my improvements may be used with any type of wheel suspension as may be desired. The independent type of suspension is preferred, however, and is more fully described and claimed in my aforesaid application Serial No. 13,851.

Each wheel is rotatably mounted on the usual spindle 20 carried by a knuckle 21 having the rearwardly extending steering arm 22 articulated at 23 to a tie rod 24 extending transversely of the vehicle and inwardly to the steering mechanism which will be presently more particularly described.

The knuckle 21 is swivelled on a king pin 25 lying on axis X—X which is generally vertical but preferably inclined upwardly and inwardly as shown in Fig. 2 to facilitate steering. With the wheel A positioned normally for straight ahead vehicle travel, the wheel plane 26 lies at an inclination laterally outwardly and upwardly from the vertical plane 27, the angle of inclination being commonly known as the camber angle. The king pin 25 is also preferably slightly inclined upwardly and rearwardly to provide the castering effect having well known desirable properties. When viewed from the side of the vehicle, the angle of the kingpin axis with the vehicle is known as the caster angle.

The king pin 25 is carried by a knuckle support member 28 having a generally vertically extending arm 29 adapted for pivotal connection at its ends with the respective links of the suspension mechanism. The illustrated suspension is of the general parallelogram type but preferably deviates therefrom to form a trapezoid-like geometrical figure by reason of one link being shorter than another. Thus, the upper wishbone link D is shorter than the lower wishbone link E, these links being respectively articulated between the frame and the upper and lower ends of arm 29. Thus link D has its outer end pivotally connected at 30 to the upper end of arm 29, the inner end of this link being pivotally connected to the frame. In the illustration a frame-supported shock absorber 31 pivotally supports the inner end of link D at 32. Link E has its outer end pivoted at 33 to the lower end of arm 29, the inner end of this link being pivoted to the frame-supported rod 34. A coil spring 35 acts between cross member C and link E to yieldingly support the frame structure from wheels A.

Referring now to the means for steering the wheels A, the tie rods 24 extend laterally inwardly toward each other from their respective points 23 of articulation with the steering arms 22, the inner ends of the tie rods being articulated at 36 closely adjacent each other on an idler guide link 37. This guide link as best seen in Fig. 1 extends forwardly beneath the cross member C for connection with a pivot pin 38 which is rotatably journaled in the frame support 39.

The rearwardly extending end 40 of link 37 projects rearwardly beyond the tie rod pivotal connections 36 and is offset to one side laterally of the vertical plane 41 when the wheels A are in their normal positions for straight ahead vehicle movement. This vertical plane 41 is the longitudinally extending mid-plane of the vehicle. A drag link 42 has its inwardly extending end articulated at 43 to the offset end 40 of link 37 so that normally a plane 45 containing the axis of pivot pin 38 in passing through the pivot point 43 makes an angle 46 with the vertical plane 41.

The outer end of drag link 42 is articulated at 47 to the steering pitman arm 48 of the usual steering gear operating mechanism 49 adapted for actuation by the usual rotatable shaft 50 which projects rearwardly and upwardly into the vehicle driver's compartment (not shown) for operation by the usual steering wheel carried on the upper end thereof according to well known practice. Normally the arm 48, as will be best apparent from the diagrammatic showing in Fig. 3, lies along an axis 51 lying at the same aforesaid angle 46 with a plane 53 parallel to plane 41. The arm 48 is adapted to swing about a pivot 54 so that the drag link operating end thereof moves along an arc 55 in imparting steering movement to wheels A. Likewise the point of articulation 43 moves about an arc 56 having the axis of pin 38 as the center.

Heretofore with the steering wheels A in their normal straight ahead position, it has been customary to arrange link 37 and arm 48 parallel to each other and also parallel to the vertical longitudinal mid-plane 41, but since the articulated point 47 is ordinarily spaced longitudinally of the vehicle from articulated point 43, such arrangement results in unequal arcs of swinging of link 37 to either side of the normal longitudinal position thereof for given equal arcs of swing of the arm 48 to either side of its normal longitudinal position. This results, therefore, in unequal steering movements of the ground steering wheels to the right and left for equal movements of the hand steering wheel in opposite directions. With my steering mechanism I have corrected the aforesaid objectionable characteristics since with my arrangement the ground steering wheels A will move equally to the right and left for equal opposite movements of the hand steering wheel.

In order to determine the angles 46 for the normal positions of link 37 and arm 48, it is only necessary to arrange the drag link 42 as a common tangent of the arcs 55 and 56 and then locate link 37 and arm 48 perpendicular to the tangent. With such arrangements the link 37 will swing equally in opposite directions for a given arcuate travel of arm 48 in opposite directions from the normal position thereof as illustrated in Fig. 3.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a motor vehicle having steering ground wheels and a steering gear provided with a pitman arm, tie rods extending from said wheels generally toward each other, an idler guide link articulated at one end thereof to the inner ends of said tie rods, means for pivotally supporting the other end of said guide link for lateral swinging, a drag link extending generally transversely of the vehicle and having its ends spaced longitudinally of the vehicle and respectively articulated to said pitman arm and said guide link, said drag link lying at an acute angle with the vertical longitudinal mid-plane of the vehicle and normally disposed tangentially to the arcs of swinging of said pitman arm and guide link when said wheels are positioned for straight ahead vehicle travel whereby to substantially equalize steering movements of said wheels in opposite directions for equal amounts of arcuate travel of said pitman arm to either side of said normal position thereof.

2. In a motor vehicle having steering ground wheels and a steering gear provided with a pitman arm, an idler guide link normally disposed approximately in the vertical longitudinal mid-plane of the vehicle, means providing a pivotal support for the forward end of the guide link accommodating swinging movement of the rear end of the guide link transversely of the vehicle to either side of said mid-plane, a drag link extending transversely of the vehicle and articulated between the pitman arm and the rear end of guide link, a tie rod articulated between each of said wheels and the guide link, the points of articulation between the tie rods and guide link being disposed symmetrically with respect to said mid-plane and the point of articulation between the drag link and the guide link being disposed to one side of said mid-plane when the wheels are positioned for straight ahead vehicle travel to substantially equalize steering movements of said wheels in opposite directions for equal amounts of arcuate travel of the pitman arm to either side of its normal position.

3. In a motor vehicle having front steering wheels each provided with a steering arm, a steering gear disposed at one side of the longitudinal vertical mid-plane of the vehicle and having a pitman arm adapted to be swung to either side of a normal position thereof corresponding to straight ahead vehicle travel, tie rods articulated at their outer ends to said steering arms respectively, a drag link articulated at its outer end and extending transversely of the vehicle to normally position the inner end of the drag link on the other side of said mid-plane, an idler guide link extending longitudinally of the vehicle, means for pivotally supporting one end of the guide link in said mid-plane, and means for articulating the inner ends of the tie rods and the inner end of the drag link to the guide link.

4. In a motor vehicle having front steering wheels each provided with a steering arm, a steering gear disposed at one side of the longitudinal vertical mid-plane of the vehicle and having a pitman arm adapted to be swung to either side of a normal position thereof corresponding to straight ahead vehicle travel, tie rods articulated at their outer ends to said steering arms respectively, a drag link articulated at its outer end and extending transversely of the vehicle to normally position the inner end of the drag link on the other side of said mid-plane, an idler guide link extending longitudinally of the vehicle, means for pivotally supporting one end of the guide link in said mid-plane, and means for articulating the inner ends of the tie rods and the inner end of the drag link to the guide link, the vertical plane containing said pitman arm normally lying at an inclination with said mid-plane and approximately parallel with the vertical plane containing the guide link pivotal support and the point of articulation of the inner end of the drag link.

FREDERIC W. SLACK.